Patented June 24, 1947

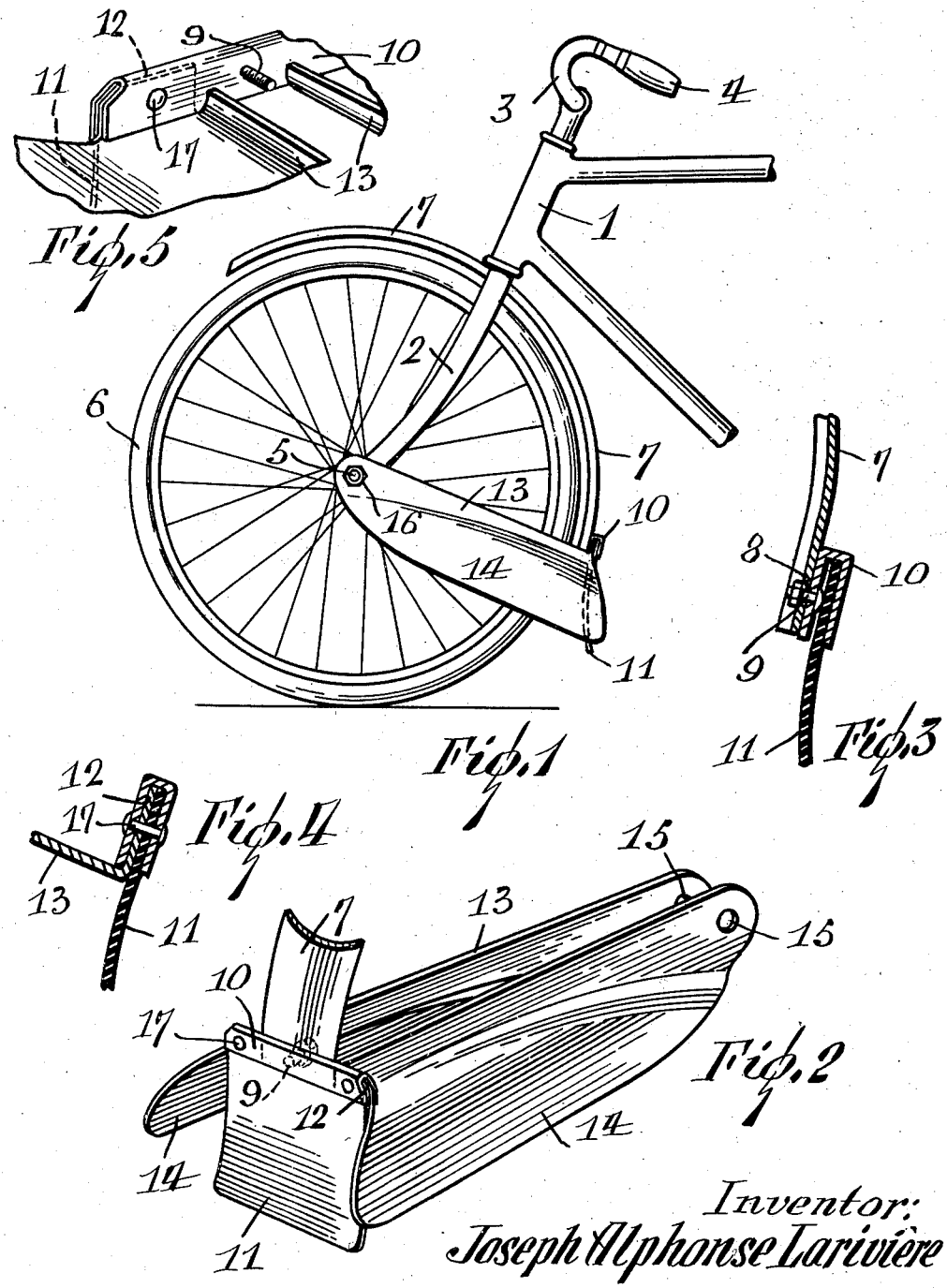

2,422,836

UNITED STATES PATENT OFFICE 2,422,836

MUDGUARD FOR BICYCLES

Joseph Alphonse Larivière, Ste. Henedine, Quebec, Canada

Application April 6, 1946, Serial No. 660,060

6 Claims. (Cl. 280—152.1)

The present invention pertains to a novel mudguard for bicycles adapted for attachment to the usual fender over the front wheel and is so constructed that the rider is fully protected in wet and muddy weather.

The principal object of the invention is to provide a simple construction for accomplishing the above stated purpose. Another object is to provide such a device that can readily be attached to the front fender or removed therefrom at will.

In the accomplishment of these objects, the device comprises a pair of sheet metal shields extending from the rearward portion of the front fender to the center of the front wheel. More specifically, a cross member in the form of a downwardly facing channel is secured to the rear portion of the front fender, and the aforementioned shields are attached thereto. At the forward end the shields are perforated in order to slip over the front axle after removal of the usual nuts at the outer sides of the fork. The forward ends of the shields are secured in position by re-applying the nuts.

The transverse channel member extends laterally beyond both edges of the front fender and has its midpoint secured to the fender by simple means such as a bolt and nut. The shields are secured by tongues extending therefrom into the channel at the projecting ends thereof, in which they are secured by means of rivets. Also, a depending flexible flap is preferably inserted in the channel and held therein by the same rivet. The flap prevents dirt and mud being thrown rearwardly against the rider.

The invention is fully disclosed by way of example in the following description and in the accompanying drawings in which:

Figure 1 is an elevation of the forward portion of a bicycle equipped according to the invention;

Figure 2 is a perspective view of the device constituting the invention;

Figure 3 is a vertical section taken at center of the rear end of the mudguard;

Figure 4 is a vertical section taken in line with one of the rivets of the rear end of the mudguard constituting this invention; and Figure 5 is a detail perspective view showing the manner in which the device is assembled.

Reference to these views will now be made by use of like characters which are employed to designate corresponding parts throughout.

In Figure 1 is shown the forward portion of a bicycle comprising, as usual, the forward frame post 1 in which is mounted a fork 2 which is turned by means of the usual handle bars 3 equipped with hand grips 4. The lower end of the fork 2 carries the front axle 5 on which is mounted the front wheel 6 of the bicycle. The conventional arcuate fender 7 lying over the front wheel 6 is fastened through and secured to the fork 2 directly beneath the post 1.

The rear or lower end of the fender 7 is formed with a hole 8 receiving a bolt 9 which secures a cross bar 10 in the form of a horizontal and downwardly facing channel, as illustrated in Figure 3. The member 10 extends somewhat beyond both edges of the member 7, as may be seen in Figure 2. The member 10 receives the upper edge of a flexible flap 11 as well as a pair of spaced tongues 12 associated respectively with shields 13 extending along both sides of the wheel 6 as far as the front axle 5. The members 13 are preferably metal stampings of wing shape and somewhat elongated as shown. The upper portion of each member is flat, while the lower portion is bent outwardly in the form of a cheek 14. The spacing between the wheel and the respective cheeks is such as to receive the mud and dirt thrown upward from the ground by the wheel. The forward end of each shield is rounded as shown in Figure 2 and apertured at 15 to be fitted on the axle 5 on which it is held by means of a nut 16.

In order to secure the flap 11 and tongues 12 to the channel 10, a suitable number of rivets 17 are passed through and fastened in these parts. The rivets are preferably disposed at the ends of the member 10 in order not to interfere with the bolt 9 which secures the member 10 to the lower end of the fender 7.

In installing the device, it is only necessary to remove the usual nuts 16 from the front axle 5 and mount the forward ends of the shields 13 on the axle 5 at the apertures 15. The nuts are then replaced and tightened sufficiently to hold the cheeks securely against the lower end of the fork 2. The hole 8 in lower end of fender 7 receives the bolt 9 which supports the transverse channel 10. The flap 11 extends nearly to the ground and prevents the mud and dirt from being thrown rearwardly against the rider. The cheeks 13 catch any mud and dirt that might otherwise be thrown upwardly and laterally of the conventional center 7. The rider is thereby perfectly protected.

Although a specific embodiment of the invention has been illustrated and described, it will be understood that various alterations in the details of construction may be made without departing from the scope of the invention as indicated by the appended claims.

What I claim as my invention is:

1. In combination with the front wheel of a bicycle having a fender over the same, a mudguard comprising a downwardly facing channel secured transversely on the rear portion of said fender, a pair of shields extending from said channel to the center of said wheel, said shields having tongues secured in said channel, and means for securing said shields to the center of said wheel.

2. In combination with the front wheel of a bicycle having a fender over the same, a mudguard comprising a downwardly facing channel secured transversely on the rear portion of said fender, a pair of shields extending from said channel to the center of said wheel, said shields having tongues secured in said channel, the lower edges of said shields being bent outwardly from said wheel, and means for securing said shields to the center of said wheel.

3. In combination with the front wheel of a bicycle having a fender over the same, a mudguard comprising a downwardly facing channel secured transversely on the rear portion of said fender, a pair of shields extending from said channel to the center of said wheel, said shields having tongues secured in said channel, a flexible flap secured in and depending from said channel, and means for securing said shields to the center of said wheel.

4. In combination with the front wheel of a bicycle having a fender over the same, a mudguard comprising a downwardly facing channel secured transversely on the rear portion of said fender, a pair of shields extending from said channel to the center of said wheel, said shields having tongues secured in said channel, a flexible flap secured in and depending from said channel, the lower edges of said shields being bent outwardly from said wheel, and means for securing said shields to the center of said wheel.

5. In combination with the front wheel of a bicycle having a fender over the same, a mudguard comprising a downwardly facing channel secured at its midpoint on the rear portion of said fender and projecting beyond both edges of said fender, a pair of shields extending from said channel to the center of said wheel, said shields having tongues secured in the extending portions of said channel, and means for securing said shields to the center of said wheel.

6. In combination with the front wheel of a bicycle having a fender over the same, a mudguard comprising a downwardly facing channel secured at its midpoint on the rear portion of said fender and projecting beyond both edges of said fender, a pair of shields extending from said channel to the center of said wheel, said shields having tongues secured in the extending portions of said channel, a flexible flap secured in and depending from said channel, and means for securing said shields to the center of said wheel.

JOSEPH ALPHONSE LARIVIÈRE.

REFERENCES CITED

The following references are of record in the file of this patent:

UNITED STATES PATENTS

| Number | Name | Date |
|---|---|---|
| 1,241,091 | Chapman | Sept. 25, 1917 |
| 1,015,774 | Barber | Jan. 30, 1912 |
| 1,178,337 | Newton | Apr. 4, 1916 |

FOREIGN PATENTS

| Number | Country | Date |
|---|---|---|
| 31,209 | Denmark | Jan. 19, 1923 |